US008130707B2

(12) United States Patent
Iwai et al.

(10) Patent No.: US 8,130,707 B2
(45) Date of Patent: Mar. 6, 2012

(54) RADIO COMMUNICATION SYSTEM, RADIO TRANSMISSION DEVICE, AND RACH TRANSMISSION METHOD

(75) Inventors: Takashi Iwai, Ishikawa (JP); Daichi Imamura, Kanagawa (JP); Sadaki Futagi, Ishikawa (JP); Atsushi Matsumoto, Ishikawa (JP)

(73) Assignee: Panasonic Corporation, Osaka (JP)

( * ) Notice: Subject to any disclaimer, the term of this patent is extended or adjusted under 35 U.S.C. 154(b) by 689 days.

(21) Appl. No.: 12/162,720

(22) PCT Filed: Jan. 30, 2007

(86) PCT No.: PCT/JP2007/051504
§ 371 (c)(1),
(2), (4) Date: Jul. 30, 2008

(87) PCT Pub. No.: WO2007/088854
PCT Pub. Date: Aug. 9, 2007

(65) Prior Publication Data
US 2009/0040973 A1 Feb. 12, 2009

(30) Foreign Application Priority Data

Jan. 31, 2006 (JP) ................................ 2006-023607
Mar. 24, 2006 (JP) ................................ 2006-083380

(51) Int. Cl.
*H04W 4/00* (2009.01)
(52) U.S. Cl. ....................................... 370/329; 370/330
(58) Field of Classification Search .................. 370/312, 370/329, 432
See application file for complete search history.

(56) References Cited

U.S. PATENT DOCUMENTS

| 6,259,724 | B1 * | 7/2001 | Esmailzadeh | 375/143 |
| 6,714,511 | B1 | 3/2004 | Sudo | |
| 6,757,293 | B1 * | 6/2004 | Chuah et al. | 370/432 |
| 6,847,626 | B1 | 1/2005 | Carneal | |
| 6,954,464 | B2 * | 10/2005 | Jurgensen et al. | 370/437 |
| 7,302,276 | B2 * | 11/2007 | Bernhardsson et al. | 455/522 |
| 2004/0228294 | A1 * | 11/2004 | Kim et al. | 370/312 |
| 2007/0010270 | A1 * | 1/2007 | Dillon | 455/513 |

(Continued)

FOREIGN PATENT DOCUMENTS

| CN | 1322423 | 11/2001 |
| JP | 5-63671 | 3/1993 |
| JP | 08-154097 | 6/1996 |
| JP | 2000-083005 | 3/2000 |

(Continued)

OTHER PUBLICATIONS

International Search Report dated Mar. 6, 2007.

(Continued)

*Primary Examiner* — Chi Pham
*Assistant Examiner* — Farah Faroul
(74) *Attorney, Agent, or Firm* — Dickinson Wright PLLC

(57) ABSTRACT

Disclosed are a radio communication system, a radio transmission device, and a Random Access Channel (RACH) transmission method capable of reducing the important information conflict probability and improving the communication system throughput in a channel transmitted at a random timing such as RACH. In a frame configuration used by the communication system, the number of slots of RACH is reduced by one and the resource for the slot is equally allocated as a resource for a pilot/User Equipment-Identification (UE-ID) of other slots. This increases the resource amount of the pilot/UE-ID. Furthermore, the resource of the pilot/UE-ID is divided into a plurality of sub slots, which are allocated as resource blocks for respective mobile stations.

20 Claims, 18 Drawing Sheets

U.S. PATENT DOCUMENTS

| | | | |
|---|---|---|---|
| 2007/0117566 A1* | 5/2007 | Khawand et al. | 455/446 |
| 2007/0174885 A1* | 7/2007 | Hus et al. | 725/105 |
| 2007/0263579 A1* | 11/2007 | Ozluturk | 370/338 |
| 2007/0291696 A1* | 12/2007 | Zhang et al. | 370/331 |
| 2008/0123616 A1* | 5/2008 | Lee | 370/344 |
| 2008/0285670 A1* | 11/2008 | Walton et al. | 375/260 |
| 2009/0203384 A1* | 8/2009 | Vujcic | 455/450 |
| 2009/0225707 A1* | 9/2009 | Baldemair et al. | 370/329 |
| 2010/0172299 A1* | 7/2010 | Fischer et al. | 370/328 |
| 2010/0220666 A1* | 9/2010 | Imamura et al. | 370/329 |
| 2011/0216700 A1* | 9/2011 | Moon et al. | 370/328 |

FOREIGN PATENT DOCUMENTS

| | | |
|---|---|---|
| JP | 2000-244441 | 9/2000 |
| JP | 2005-236771 | 9/2005 |
| JP | 2005-253021 | 9/2005 |

OTHER PUBLICATIONS

Partial English Translation of JP 05-063671 dated Mar. 12, 1993.
3GPP TS 25.214 V6.7.1, "3rd Generation Partnership Project; Technical Specification Group Radio Access Network; Physical layer procedures (FDD) (Release 6)," Dec. 2005, pp. 1-60.

* cited by examiner

| UE ACCESS COUNT (M) | RACH SLOT TYPE |
|---|---|
| M ≦ 8 | SLOT TYPE 4 |
| 8 < M ≦ 16 | SLOT TYPE 3 |
| 16 < M ≦ 32 | SLOT TYPE 2 |
| 32 < M | SLOT TYPE 1 |

FIG.14

| NUMBER OF RACH RETRANSMITTED (N) | RACH SLOT TYPE |
|---|---|
| $N \leq 1$ | SLOT TYPE 4 |
| $1 < N \leq 4$ | SLOT TYPE 3 |
| $4 < N \leq 8$ | SLOT TYPE 2 |
| $8 < N$ | SLOT TYPE 1 |

FIG.18

RADIO COMMUNICATION SYSTEM, RADIO TRANSMISSION DEVICE, AND RACH TRANSMISSION METHOD

TECHNICAL FIELD

The present invention relates to a radio transmitting apparatus and a radio communication system provided with the radio transmitting apparatus that transmit the RACH (Random Access Channel) and the like.

BACKGROUND ART

Currently, studies are conducted for the RACH transmission method in 3GPP RAN LTE (Long Term Evolution). The RACH is an uplink channel which a mobile station, which is a communication terminal, uses upon shifting from idle mode to calling steps. Information including communication terminal identification information (User Equipment-Identification: UE-ID), a pilot, an association request, a resource request and transmission power required to establish a scheduled channel is transmitted to the base station using this RACH.

The RACH is a contention-based channel and cannot be scheduled by the base station, and so a mobile station takes the initiative to select transmission resources (e.g. transmission timing, frequency and code) on a random basis. If transmission resource blocks such as frequency band overlap between a plurality of users and the RACHs collide, the base station cannot correctly receive or demodulate data, and the mobile station have to retransmit the RACH to the base station.

For example, when the slotted ALOHA in W-CDMA disclosed in non-patent document 1 is applied, and, as shown in FIG. 1, the base station selects one from predetermined resource blocks (slots A to E) on a random basis, and transmits the RACH.

Non-patent Document 1: "6. Random access procedure," 3GPP, TS25.214 V6.6.0 (2005-06)

DISCLOSURE OF INVENTION

Problems to be Solved by the Invention

However, with the technique disclosed in non-patent document 1, all of the transmission information need to be retransmitted using the RACH. Then, if the number of times the RACH is retransmitted increases, this leads to a vicious circuit where the rate of collision with other RACHs to be transmitted later increases and furthermore the throughput of the RACH decreases. As a result, communication delay time of information transmitted in the RACH increases.

It is therefore an object of the present invention to provide a radio communication system, radio transmitting apparatus and radio transmission method that prevent retransmissions of the RACH and improve throughput of the communication system.

Means for Solving the Problem

The radio communication system of the present invention in which a resource block for a channel transmitted from a plurality of radio transmitting apparatuses at random timings comprises a first resource block allocated to data to be prevented from collision between the plurality of radio transmitting apparatuses, and a second resource block allocated to data other than the data to be prevented from collision, adopts a configuration including: a first allocation section that allocates the data to be prevented from collision to a first resource block; and a second allocation section that allocates the data other than the data to be prevented from collision to the second resource block.

Advantageous Effect of the Invention

According to the present invention, for channels transmitted at random timings such as the RACH, it is possible to reduce collision rates of significant information and improve throughput of the communication system.

BRIEF DESCRIPTION OF DRAWINGS

FIG. 14 is an example showing a data table used to select a transmission slot type based on the UE access count;

FIG. 18 is an example showing the data table used when a transmission slot type is selected based on the number of times the RACH is retransmitted.

BEST MODE FOR CARRYING OUT THE INVENTION

Now, embodiments of the present invention will be described in detail with reference to the accompanying drawings. A base station will be referred to as "Node B", and a mobile station will be referred to as "UE." Moreover, each embodiment will be premised upon the following preconditions.

(1) The RACH transmits communication terminal identification information (UE-ID), the pilot and other transmission information.
(2) UE-ID refers to information that allows a base station to identify mobile stations.
(3) The pilot refers to data that is known between the transmission side and the receiving side and used for detecting receiving timings and channel estimation.
(4) Other transmission information refer to information including an association request, a resource request and transmission power.
(5) The radio transmitting apparatus according to the present invention is mounted in a mobile station and carries out uplink transmission from the mobile station to the base station.

Embodiment 1

Figure 1:
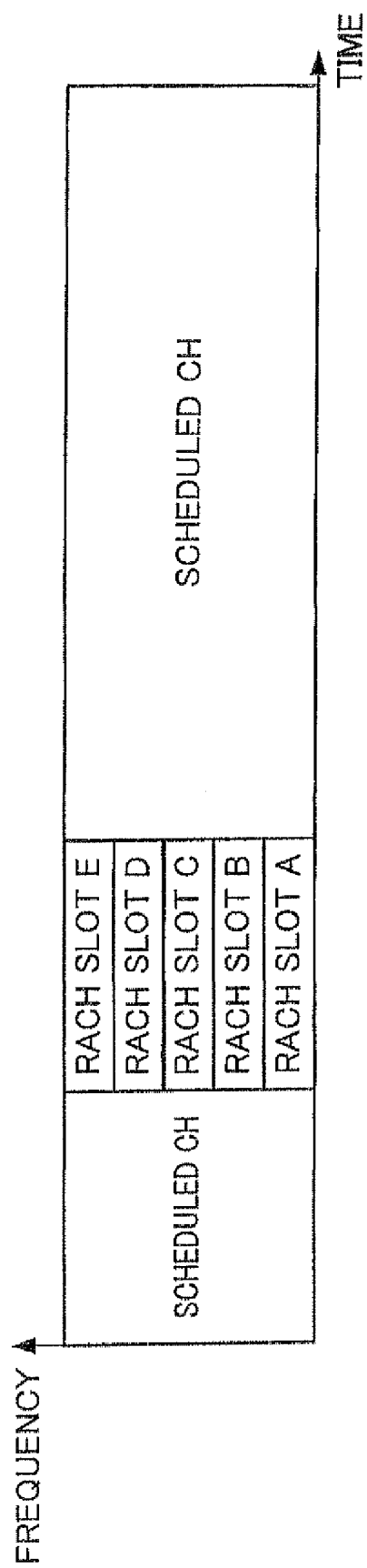
FIG. 1 is the frame configuration disclosed in non-patent document 1.
Figure 2:
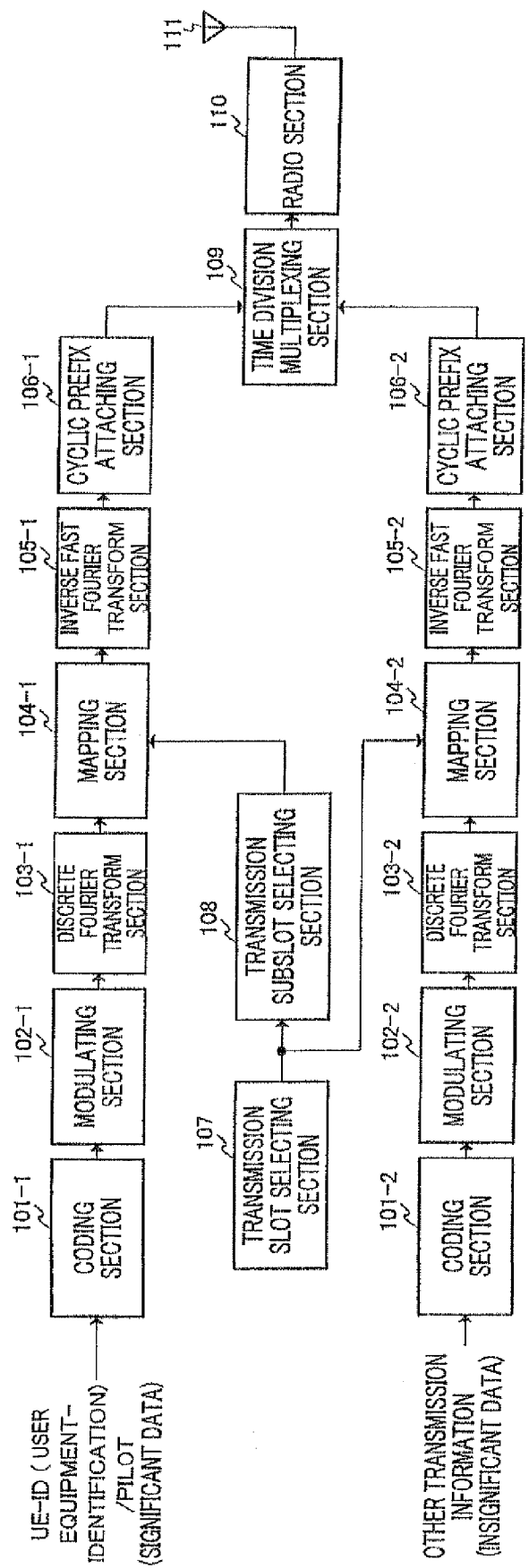
FIG. 2 is a block diagram showing the main configuration of the radio transmitting apparatus according to Embodiment 1 of the present invention.

FIG. 2 is a block diagram showing the main configuration of the radio transmitting apparatus (i.e. mobile station) according to Embodiment 1 of the present invention.

The radio transmitting apparatus according to the present embodiment is provided with coding sections 101-1 and 101-2, modulating sections 102-1 and 102-2, Discrete Fourier Transform (DFT) sections 103-1 and 103-2, mapping sections 104-1 and 104-2, Inverse Fast Fourier Transform (IFFT) sections 105-1 and 105-2, Cyclic Prefix (CP) attaching sections 106-1 and 106-2, transmission slot selecting section 107, transmission subslot selecting section 108, Time Division Multiplexing (TDM) section 109, radio section 110, and antenna 111.

The radio transmitting apparatus according to the present embodiment has a system for processing the UE-ID and pilot in transmission data and a system for processing other transmission information in the transmission data. That is, each system is provided with a plurality of components having similar functions, and the components are assigned the same reference numerals and distinguished by assigning different branch numbers ("1" is assigned to the system for processing the UE-ID and pilot, and "2" is assigned to the system for processing other transmission information).

Each section in the radio transmitting apparatus according to the present embodiment operate as follows.

Coding sections 101-1 and 101-2 perform error detection processing and error correction coding processing on transmission data. Modulating sections 102-1 and 102-2 modulate the data outputted from coding sections 101-1 and 101-2 using modulation schemes such as PSK modulation and Quadrature Amplitude Modulation (QAM). DFT sections 103-1 and 103-2 convert the transmission signals after modulation from time domain waveform to frequency components.

Transmission slot selecting section 107 selects on a random basis one slot to transmit (i.e. frequency band) and outputs the selected slot to transmission subslot selecting section 108 and mapping section 104-2. Transmission subslot selecting section 108 selects one subslot on a random basis from the slot selected in transmission slot selecting section 107 and outputs the selected subslot to mapping section 104-1.

Mapping sections 104-1 and 104-2 map the data converted to frequency components on the frequency resources in the radio frame according to the slot number outputted from transmission slot selecting section 107 and the subslot number outputted from transmission subslot selecting section 108.

IFFT sections 105-1 and 105-2 convert the data mapped in the frequency domain to time domain waveforms. CP attaching sections 106-1 and 106-2 copy a predetermined part from the rear ends of the output signals from IFFT sections 105-1 and 105-2 to generate CPs, and attach the generated CPs to the beginnings of the data parts. TDM section 109 performs TDM (Time Division Multiplexing) on the significant data and the insignificant data outputted from CP attaching sections 106-1 and 106-2. Radio section 110 performs predetermined radio transmission processing including D/A conversion and up-conversion on the signal outputted from TDM section 109 and transmits the signal after radio transmission processing via antenna 111.

Figure 3:
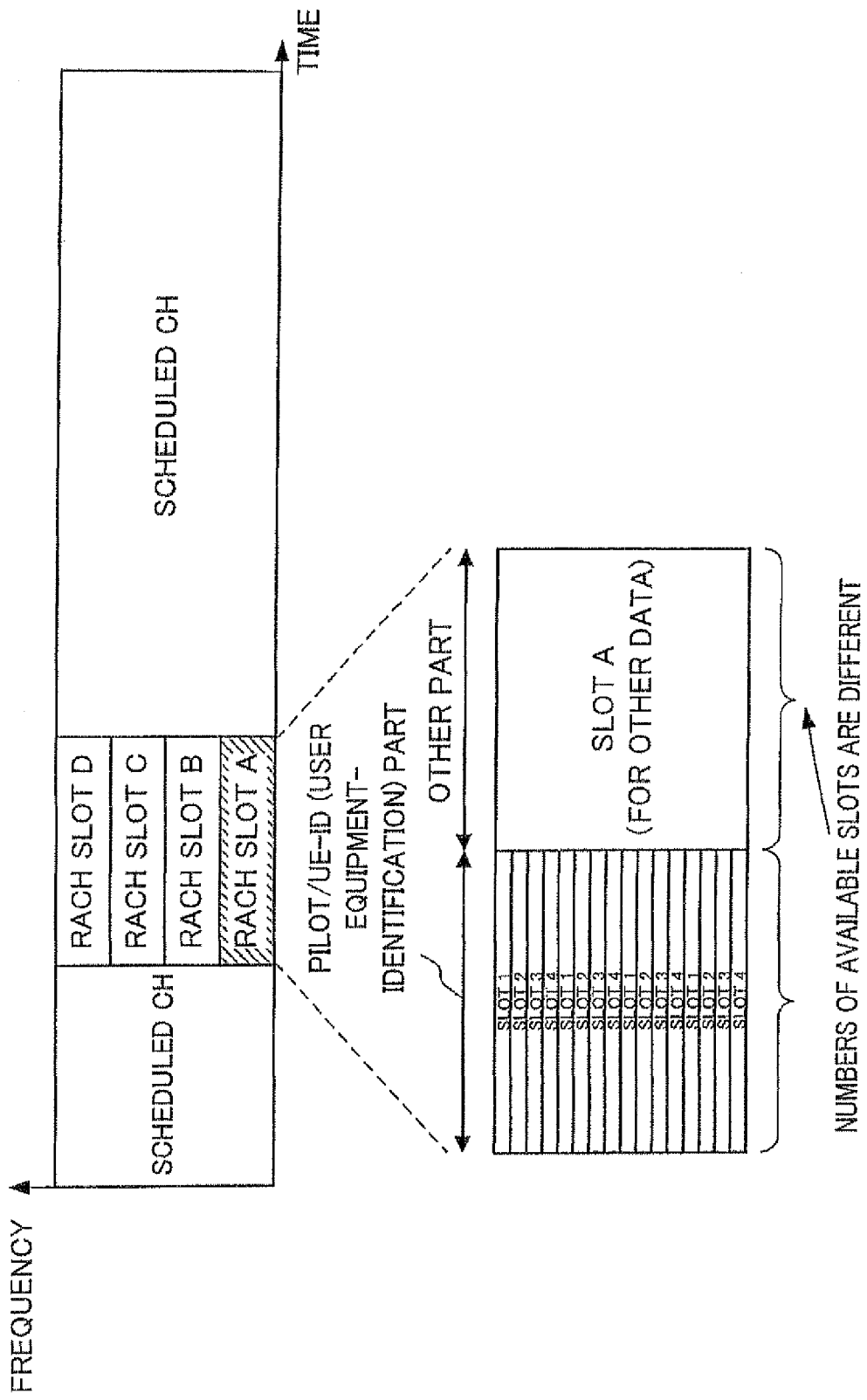
FIG. 3 illustrates the frame configuration used in the radio communication system according to Embodiment 1 of the present invention.
Figure 4:
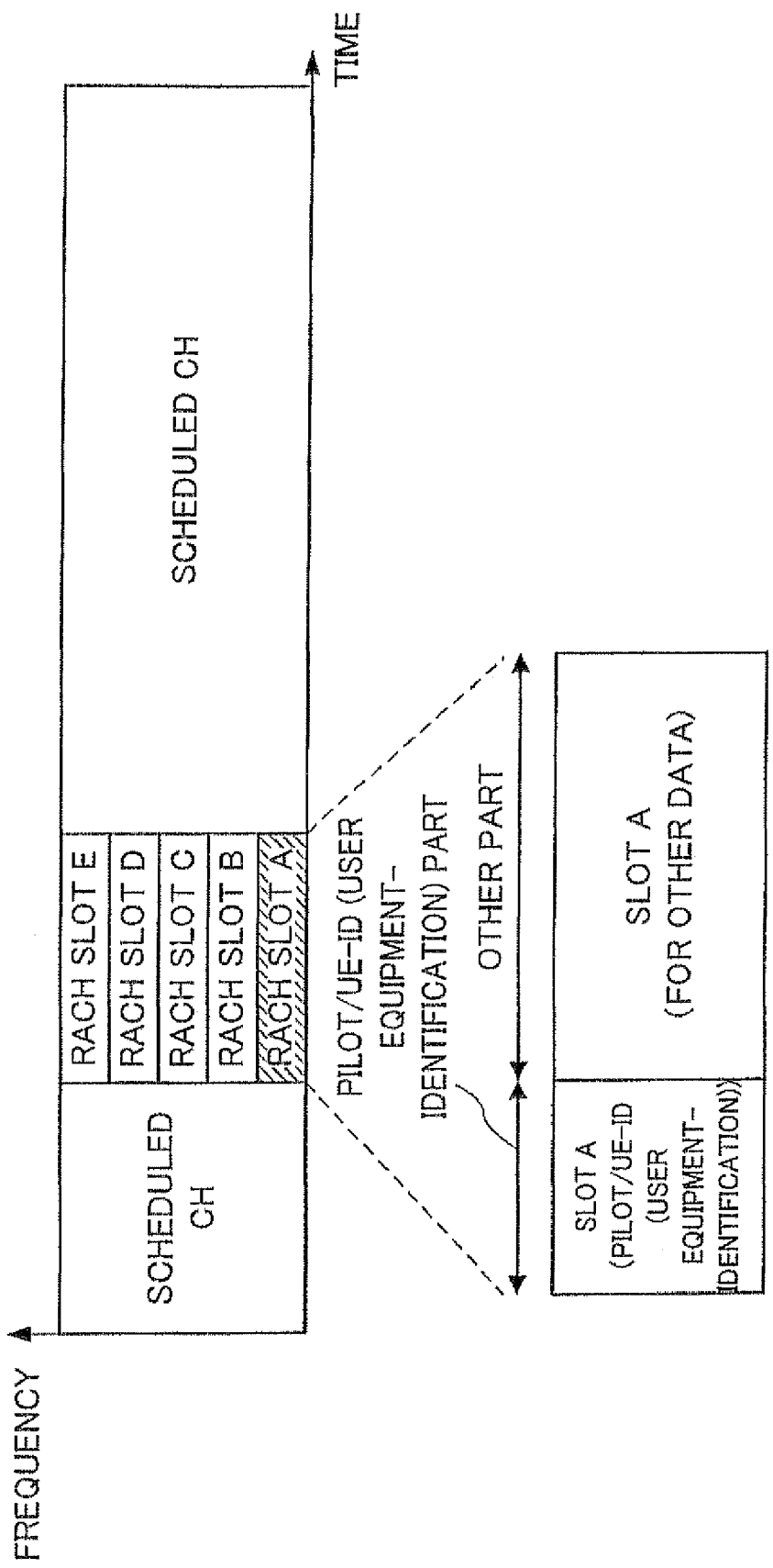
FIG. 4 is the frame configuration disclosed in non-patent document 1.

FIG. 3 illustrates the frame configuration used in the radio communication system of the present embodiment. To clarify the features of the frame configuration of the present embodiment, FIG. 4 illustrates the frame configuration disclosed in non-patent document 1.

With the present embodiment, as shown in FIG. 3, there are four RACH slots A to D. On the other hand, in non-patent document 1, as shown in FIG. 4, there are five RACH slots A to E. This is because, the present embodiment reduces the number of RACH slots by one (e.g. slot E is removed in FIG. 4), and allocates evenly the resource of this slot to other slots (e.g. slots A to D in FIG. 4).

Moreover, with the present embodiment, as shown in FIG. 3, each RACH has a pilot/UE-ID part where the pilot and UE-ID are mapped, and the rest is allocated for the part to map other transmission information. That is, the pilot/UE-ID part and other transmission information form separate resource blocks. On the other hand, in non-patent document 1, resource blocks are not provided separately for the pilot/UE-ID part and other transmission information (although, in FIG. 4, for comparison of the amount of resources in the following explanation and for ease of explanation, the figure shows in the lower part the division between the resource block for the pilot/UE-ID part and the resource block for other transmission information, but they are not actually divided in two as such).

Moreover, with the present embodiment, as shown in FIG. 3, the resource block for the pilot/UE-ID part is further divided into a plurality of subslots.

These differences arise from the fact that the radio communication system according to the present embodiment defines the frame configuration based on the following ideas. That is, with the present embodiment, the number of RACH slots is decremented by one, and the resource of this decrement slot is shared evenly between other slots. The resource newly allocated to the slots then is used as a resource for the pilot and UE-ID. Then, given that there are already resources allocated to the pilot and UE-ID, by combining these resources, the amount of resources for the pilot/UE-ID part increases (the resource for the pilot/UE-ID part corresponds to the area in the figure). Now, the present embodiment further divides the resources for the pilot/UE-ID part into a plurality of resources to generate subslots divided into a plurality of segments and allocates these subslots as resource blocks for mobile stations.

With the present embodiment, by adopting the above-described frame configuration, the amount of resource allocated to the UE-ID and pilot increases but the amount of resources for other transmission information decreases. That is, the collision rate for the UE-ID and pilot decreases, but the collision rate for other transmission information increases. This means that receiving information such as the UE-ID is prioritized over other transmission information.

On the other hand, in non-patent document 1, resources are allocated in equal proportions to all of RACH transmission information, including the pilot, the UE-ID, the association request, the resource request and the transmission power information. Accordingly, the collision rate is the same between the pilot and UE-ID and other transmission information in the RACH transmission information transmitted from a plurality of mobile stations.

With the present embodiment, if the focus is placed upon one slot (e.g. slot A), the amount of resources allocated to other transmission information (i.e. the "other part" area in the bottom of FIG. 3) is the same as the case of non-patent document 1 (i.e. the "other part" area in the bottom of FIG. 4). That is, because there is the minimum amount of resources required to transmit the association request, the resource request, transmission power information and so on, and these resources have to be secured.

Next, how the radio transmitting apparatus operates in the radio communication system according to the present embodiment adopting the above-described frame configuration will be explained. To be more specific, how transmission slot selecting section 107, transmission subslot selecting section 108 and mapping sections 104-1 and 104-2 operate will be described below.

First, transmission slot selecting section 107 in the radio transmitting apparatus of the present embodiment selects one slot from a plurality of RACH slots A to D on a random basis and commands mapping section 104-2. An example is shown here where slot A is selected from slots A to D.

Next, transmission subslot selecting section 108 selects one subslot from a plurality of subslots provided in slot A selected in transmission slot selecting section 107, and commands mapping section 104-1. In the example of FIG. 3, slots 1 to 4 each repeat a plurality of times in slot A (i.e. there are a total of 16 resource blocks), and, among these four subslots, one subslot is further selected (i.e. which equals selecting four resource blocks).

Mapping section 104-1 maps the pilot and UE-ID outputted from DFT section 103-1 in the subslot specified in transmission subslot selecting section 108. Meanwhile, mapping section 104-2 maps other transmission information outputted from DFT section 103-2 in the slot specified in transmission slot selecting section 107.

Figure 5:
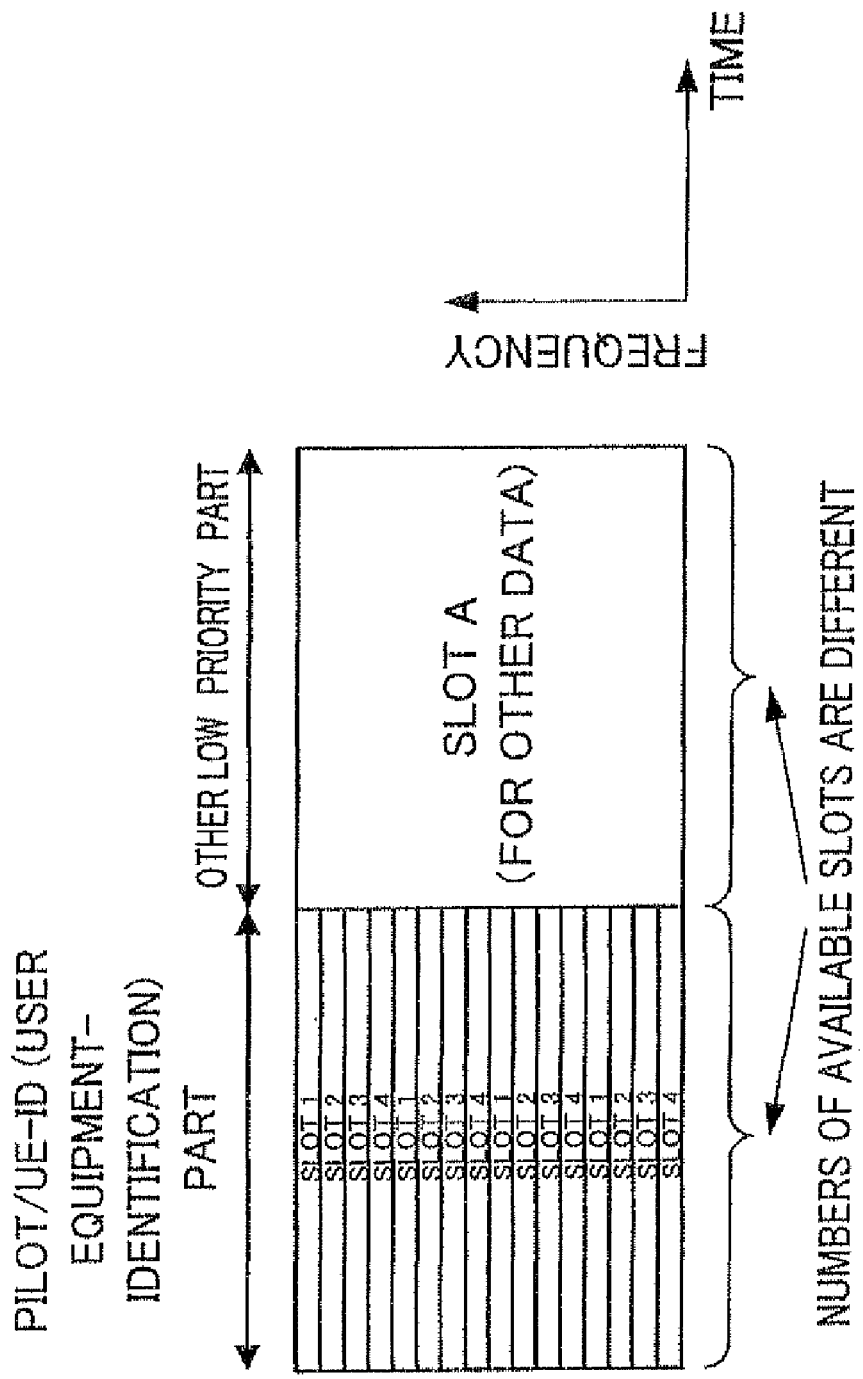
FIG. 5 is the RACH frame configuration where localized-FDMA is used.

As for the method of dividing resource blocks in the frequency domain, using distributed-FDMA (Frequency Division Multiple Access) as shown in FIG. 3, is more effective, because frequency diversity gain can be acquired when the frame configuration in FIG. 3 is used, compared to the RACH frame configuration using localized-FDMA as shown in FIG. 5, and because other transmission information and the pilot and UE-ID are in the same frequency band and the acquired pilot can be utilized for channel estimation upon demodulating other transmission information.

Figure 6:
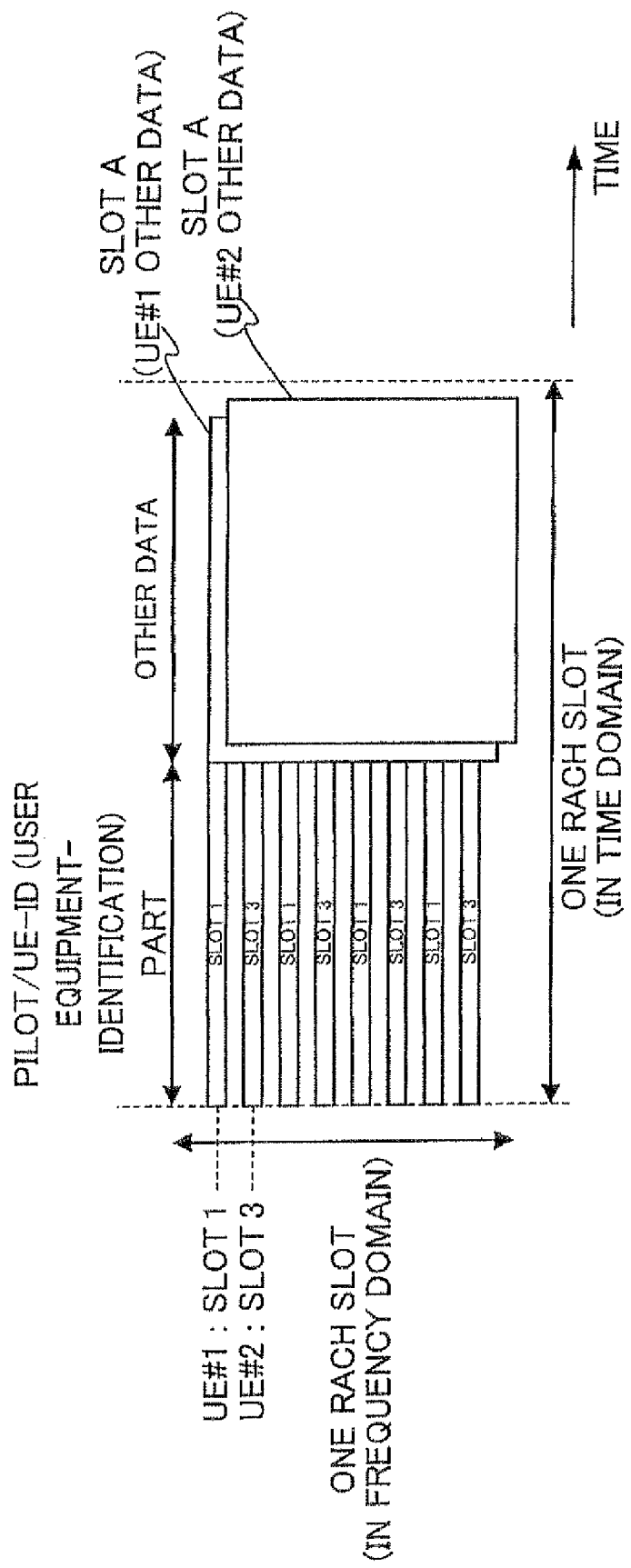
FIG. 6 is for explaining an advantage of Embodiment 1 of the present invention.

FIG. 6 is for explaining an advantage of the present embodiment. As shown in this figure, if the focus is placed upon the overall communication system in the present embodiment, the pilot/UE-ID parts in the RACHs transmitted from a plurality of UEs are frequency-divided, so that the pilots and UE-IDs are allocated to the slots of respectively different frequency bands and do not collide. Consequently, even if other transmission information in the RACHs transmitted from a plurality of UEs collide in the same time slot A and the base station cannot receive or demodulate the information, the base station can still demodulate at least the UE-ID and pilot. This is the reason the pilot/UE-ID part is prioritized over other transmission information.

In this way, according to the present embodiment, in RACH transmission, a transmission resource block (a slot) allocated to the pilot and UE-ID is set greater than the transmission resource block allocated to an association request, a resource request and transmission power. That is, with the present embodiment, the proportion of the transmission resource block for significant control information including the UE-ID is set greater than the proportion of the transmission resource block for other transmission information. Here, the RACH refers to a channel transmitted from a plurality of mobile stations at random timings without scheduling or transmission timing control. Moreover, control information such as the UE-ID and the pilot is particularly significant data and is data that needs to be prevented from collision, in the information transmitted in the RACH, because, once a collision occurs, it cannot be placed in the scheduled channel and needs to be retransmitted in the RACH. Unless control information such as the pilot and the UE-ID collides, even if other control information collides, other control information can be transmitted without collision by setting a scheduled channel. That is, unless control information such as the pilot and the UE-ID collides, RACH retransmissions do not occur.

Consequently, according to the present embodiment, by reducing the rate of collision between significant information including the UE-ID and the pilot transmitted in the RACH, so that it is possible to prevent retransmissions of the RACH and improve throughput of the communication system.

Moreover, in the above-described configuration, given that the proportion of the transmission resource block allocated to the UE-ID and pilot is greater, this transmission resource block is further divided in the frequency domain so as to allocate resource blocks (i.e. subslots) on a per UE basis. That is, subslots are generated by the FDMA scheme.

Accordingly, the UE-ID and the pilot do not interfere with transmission signals from other UEs. For example, even if other transmission information cannot be received due to collision, the UE-ID (i.e. information for identifying the transmitting UE) and the pilot (i.e. the signal for determining the receiving timing) can be at least acquired. Moreover, by this means, it is possible to allocate other transmission information to a scheduled channel rather than to the RACH and retransmit it, so that the number of times of retransmitting the RACH can be reduced. Moreover, it is possible to prevent excessive communication delay time of other transmission information.

Moreover, although a case has been explained as an example with the present embodiment where FDMA, whereby a resource block is divided in the frequency domain, is used as a method of dividing the resource block for allocating significant data, other schemes are also applicable, for including CDMA (Code Division Multiple Access) for code division, TDMA (Time Division Multiple Access) for time domain division and SDMA (Space Division Multiple Access) for spatial division. That is, for example, time, frequency and code are available for transmission resource blocks.

Figure 7:
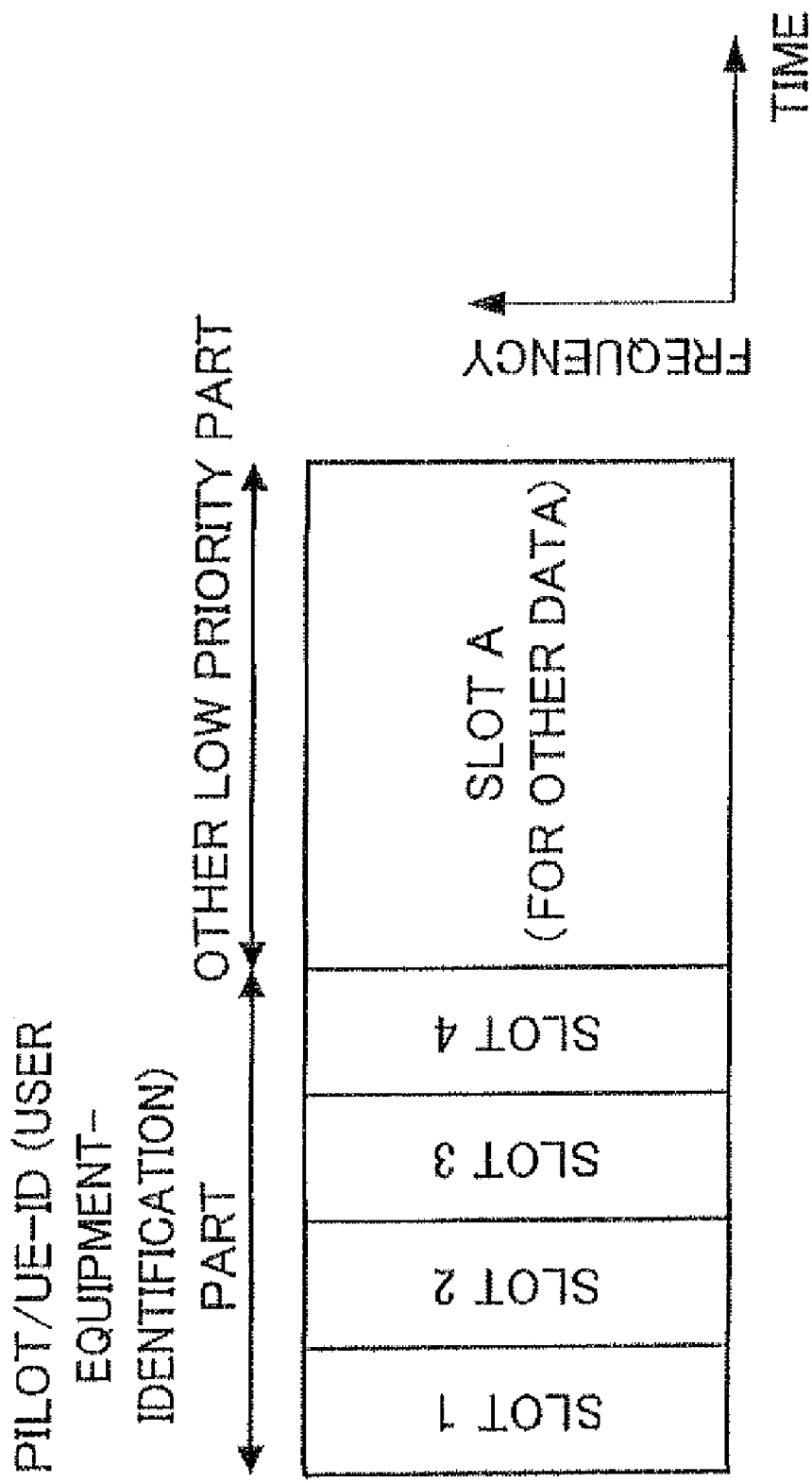
FIG. 7 is a variation showing the RACH frame configuration according to Embodiment 1 of the present invention.

For example, in a case of TDMA for time domain division, the RACH frame configuration is shown in FIG. 7. As shown in this figure, the pilot/UE-ID part is time-divided, and formed into slots 1 to 4.

Figure 8:
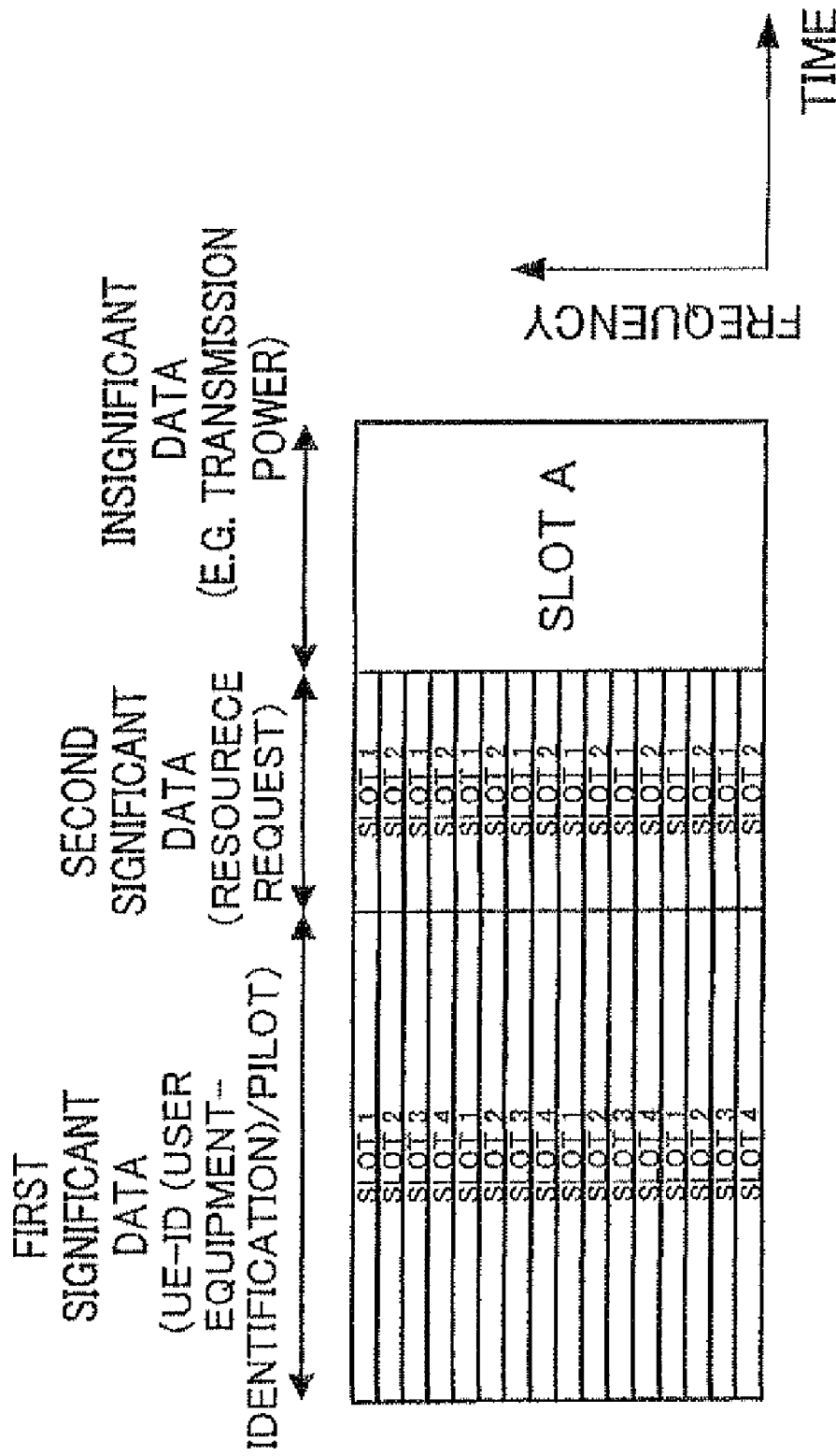
FIG. 8 is a variation showing the RACH frame configuration according to Embodiment 1 of the present invention.

Moreover, although a case has been explained with the present embodiment where a transmission resource block is divided in two, the present embodiment is not limited to this, and the transmission resource block may be divided into more than two blocks. For example, as in the RACH frame configuration shown in FIG. 8, the transmission resource block may be divided between first significant data (e.g. UE-ID and pilot), second significant data (e.g. an association request and resource request) and insignificant data (e.g. transmission power information).

Figure 9:
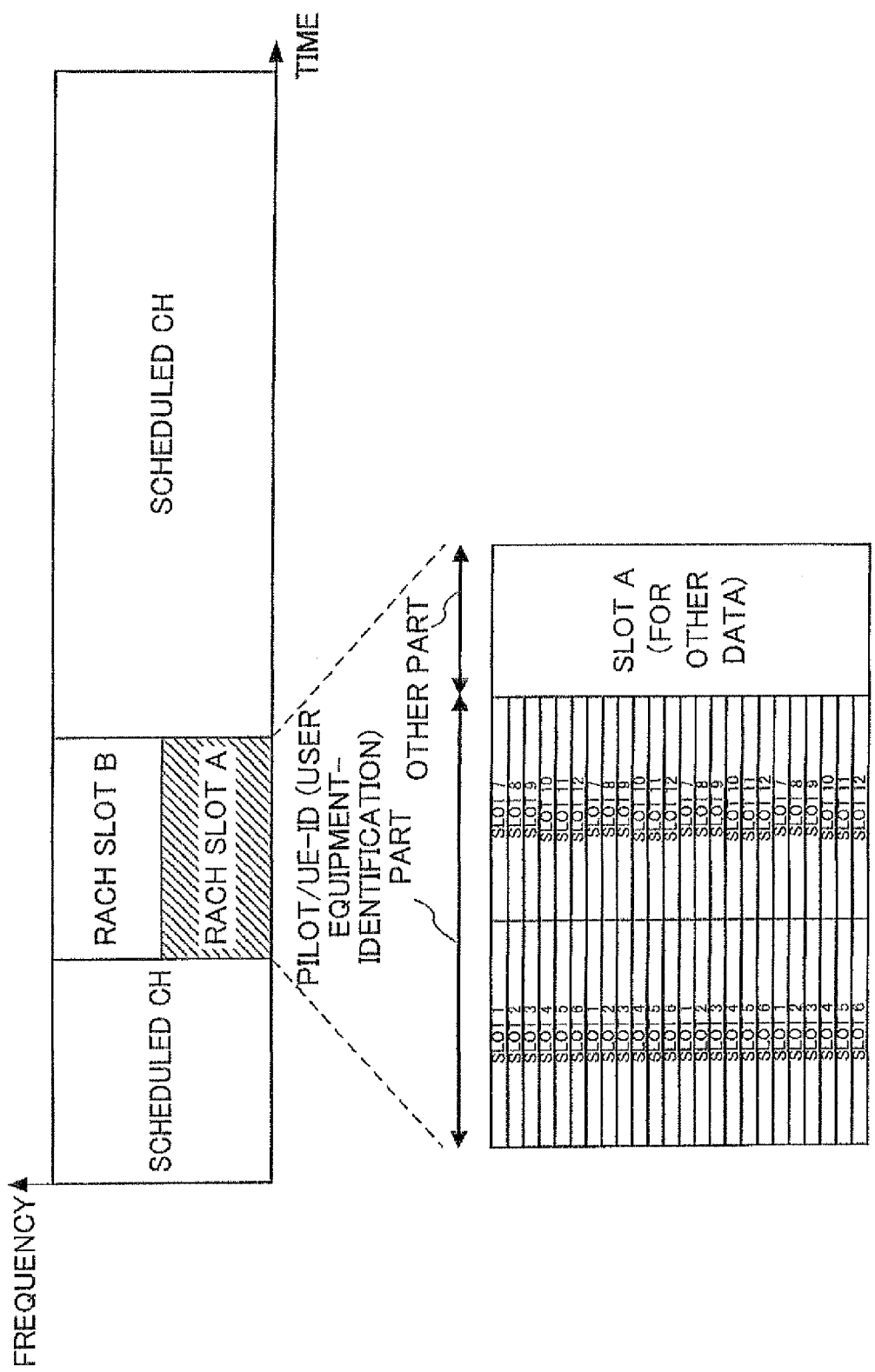
FIG. 9 is a variation showing the frame configuration according to Embodiment 1 of the present invention.

Moreover, the resource allocation between the resource block of the UE-ID and pilot and the resource block of other transmission information, that is, the resource allocation between significant data and insignificant data, may be changed on a per base station basis. A base station located in an area of high collision rate between the RACHs, for example an urban area, may use the frame configuration shown in FIG. 9. Like this example, by setting the resource allocation of the UE-ID and pilot greater than the resource allocation information of other transmission information, the collision rate for the UE-ID and pilot can be further reduced. In this case, the base station may signal the ratio of resource allocation and frame format information to the mobile stations in the area using the BCH (i.e. Broadcast Channel), for example.

Moreover, although a case has been explained as an example with the present embodiment where the pilot and UE-ID are significant information, significance may be determined with reference to the significance in scheduled channel setting. For example, in this reference for the determination, information of great significance refers to information that is essential in scheduled channel setting, information of medium significance refers to information that is necessary to define the required resource blocks for the scheduled channel and optimal MCS parameters (i.e. coding rates and modulation schemes), and information of little significance refers to information that is necessary for optimization of transmission power for the scheduled channel. To be more specific, information of medium significance includes an association request and a resource request. Even when the radio receiving apparatus (i.e. base station) cannot receive or demodulate this information, the radio receiving apparatus has only to substitute fixed resource blocks and fixed MCSs. Moreover, information of little significance includes transmission power information in a mobile station. Even when the radio receiving apparatus cannot receive or demodulate this information, the radio receiving apparatus has only to transmit the scheduled channel with the maximum power.

Embodiment 2

Figure 10:
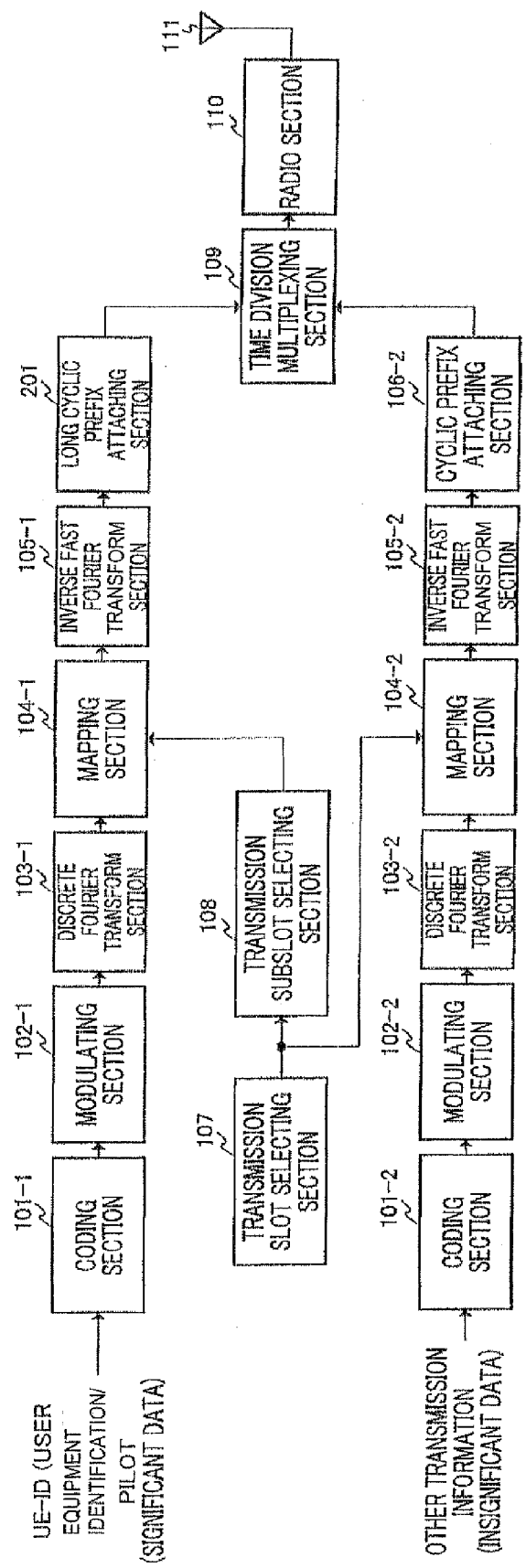
FIG. 10 is a block diagram showing the main configuration of the radio transmitting apparatus according to Embodiment 2 of the present invention.

FIG. 10 is a block diagram showing the main configuration of the radio transmitting apparatus according to Embodiment 2 of the present invention. The basic configuration of this radio transmitting apparatus is the same as shown in Embodiment 1 (see FIG. 2), the same components will be assigned the same reference numerals, and the description will be omitted. A case will be explained here as an example adopting transmission schemes using CPs such as SC (Single Carrier)-FDMA and OFDM.

The radio transmitting apparatus according to the present embodiment has long CP attaching section 201 that sets the CP length attached to the pilot and UE-ID and longer than the CP attached to other transmission information (e.g. an association request, a resource request and transmission power) in the RACH transmission.

To be more specific, long CP attaching section 201 attaches the CP having the signal length fixed based on the maximum time of anticipated propagation delay time (derived by simulations) to the UE-ID and pilot. A longer signal length is employed for the CP attached by long CP attaching section 201 than for the CP attached to other transmission information. The other configurations are as described in Embodiment 1.

Figure 11:
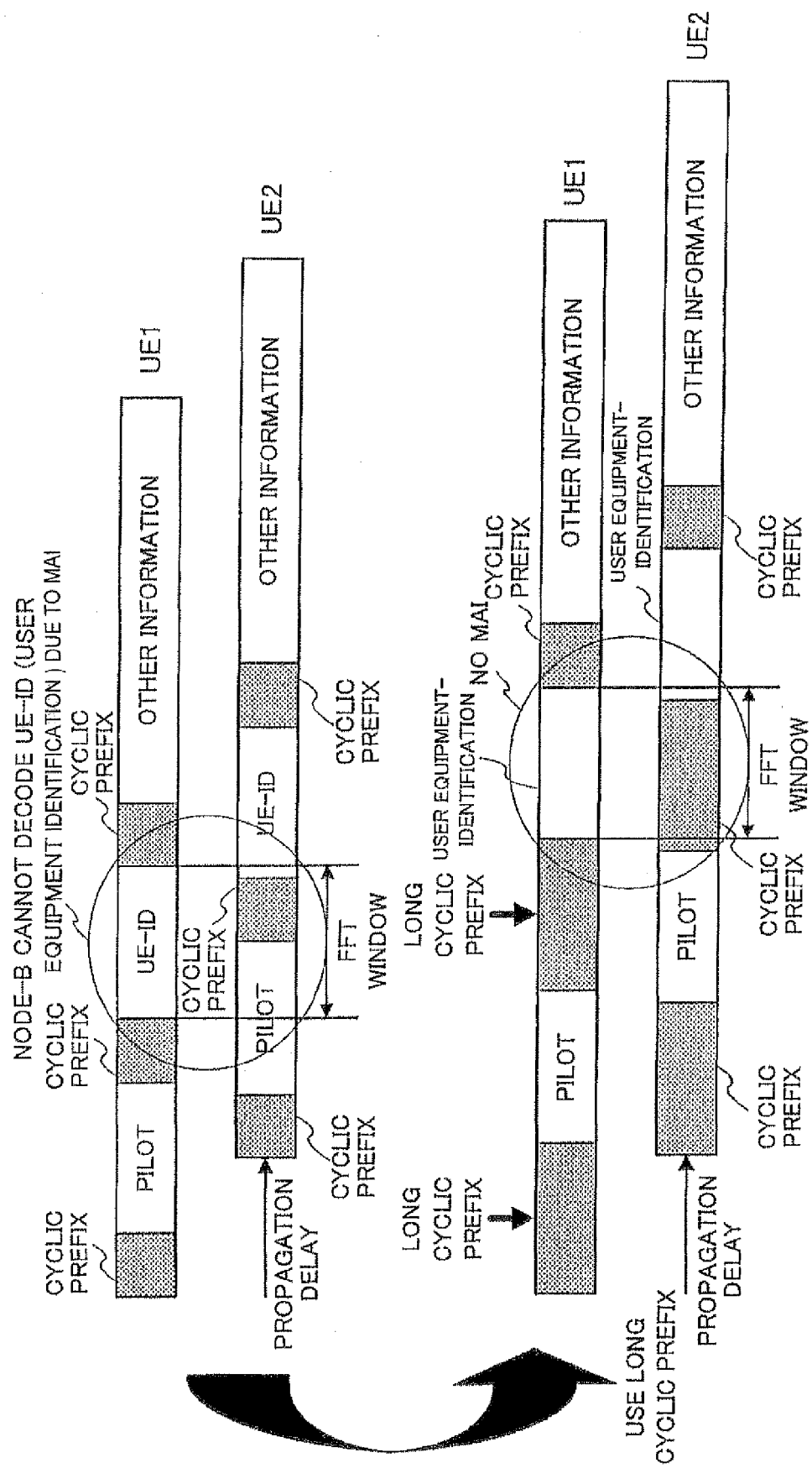
FIG. 11 is for explaining an advantage of Embodiment 2 of the present invention.

FIG. 11 is for explaining an advantage of the present embodiment. As shown in this figure, by using the long CPs, the occurrence of interference (MAI: Multiple Access Interference) between the signal for UE1 and the signal for UE2 can be prevented even though the propagation delay becomes great.

In this way, according to the present embodiment, by using long CPs, even when received timing error becomes greater due to substantial propagation delay, it is possible to make interference less likely to occur and prevent deterioration of received quality and detection performance of the receiving timing of the UE-ID of significant data from falling. As a result, the number of times of retransmitting the RACH can be reduced. Moreover, it is possible to prevent excessive communication delay time for other transmission information.

Moreover, by using the long CPs for other transmission information, it is also possible to prevent received quality deterioration of other transmission information, but, in this case, the overheads of CPs increase.

Moreover, although a case has been explained as an example with the present embodiment where the signal length of the CP is set long, the UE-ID and pilot may be repeated in the time domain instead making the CP long. In this case, the same advantage can be produced as the case of setting the CP long.

Moreover, although a case has been explained as an example with the present embodiment where the long CPs are used in addition to the configuration in Embodiment 1, the present embodiment is not limited to this, and long CP attaching section 201 alone may be provided, without characteristic components in Embodiment 1, that is, transmission slot selecting section 107 and transmission subslot selecting section 108.

Embodiment 3

Figure 12:
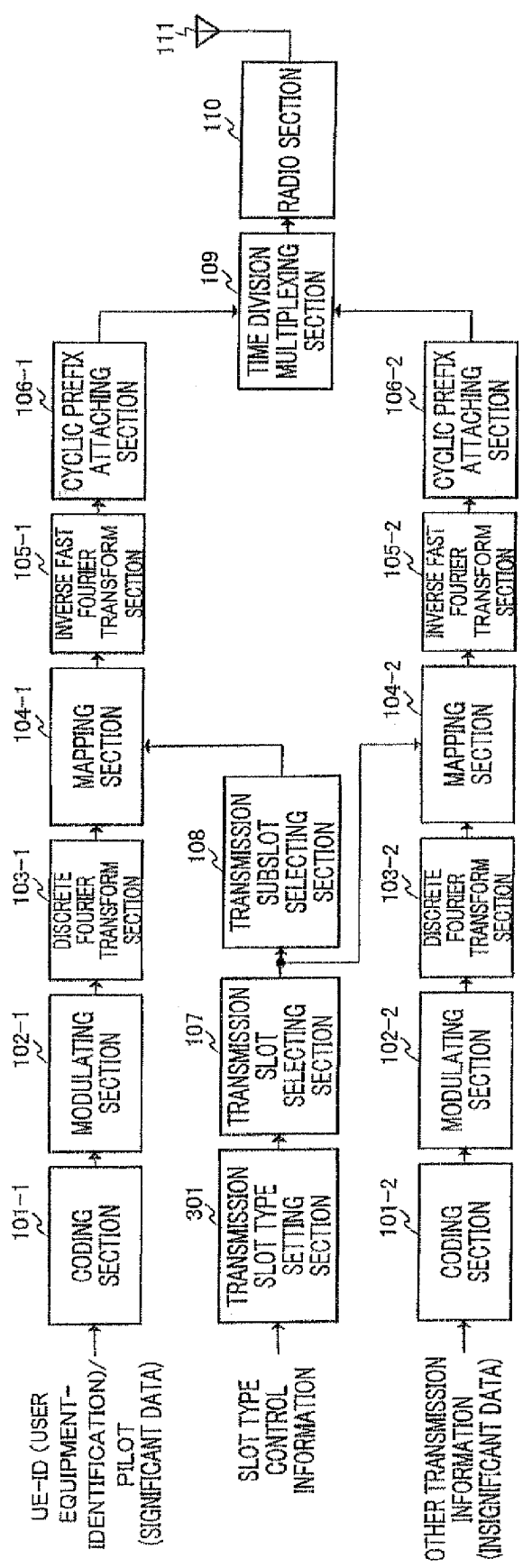
FIG. 12 is a block diagram showing the main configuration of the radio transmitting apparatus according to Embodiment 3 of the present invention.

FIG. 12 is a block diagram showing the main configuration of the radio transmitting apparatus according to Embodiment 3 of the present invention. The basic configuration of this radio transmitting apparatus is the same as the radio transmitting apparatus shown in Embodiment 1 (see FIG. 2), the same components will be assigned the same reference numerals, and the description will be omitted. For ease of explanation, with the present embodiment, "mobile station" and "base station" will be used in place of the names of "radio transmitting apparatus" and "radio receiving apparatus."

The mobile station of the present invention has transmission slot type setting section 301 additionally.

Figure 13:
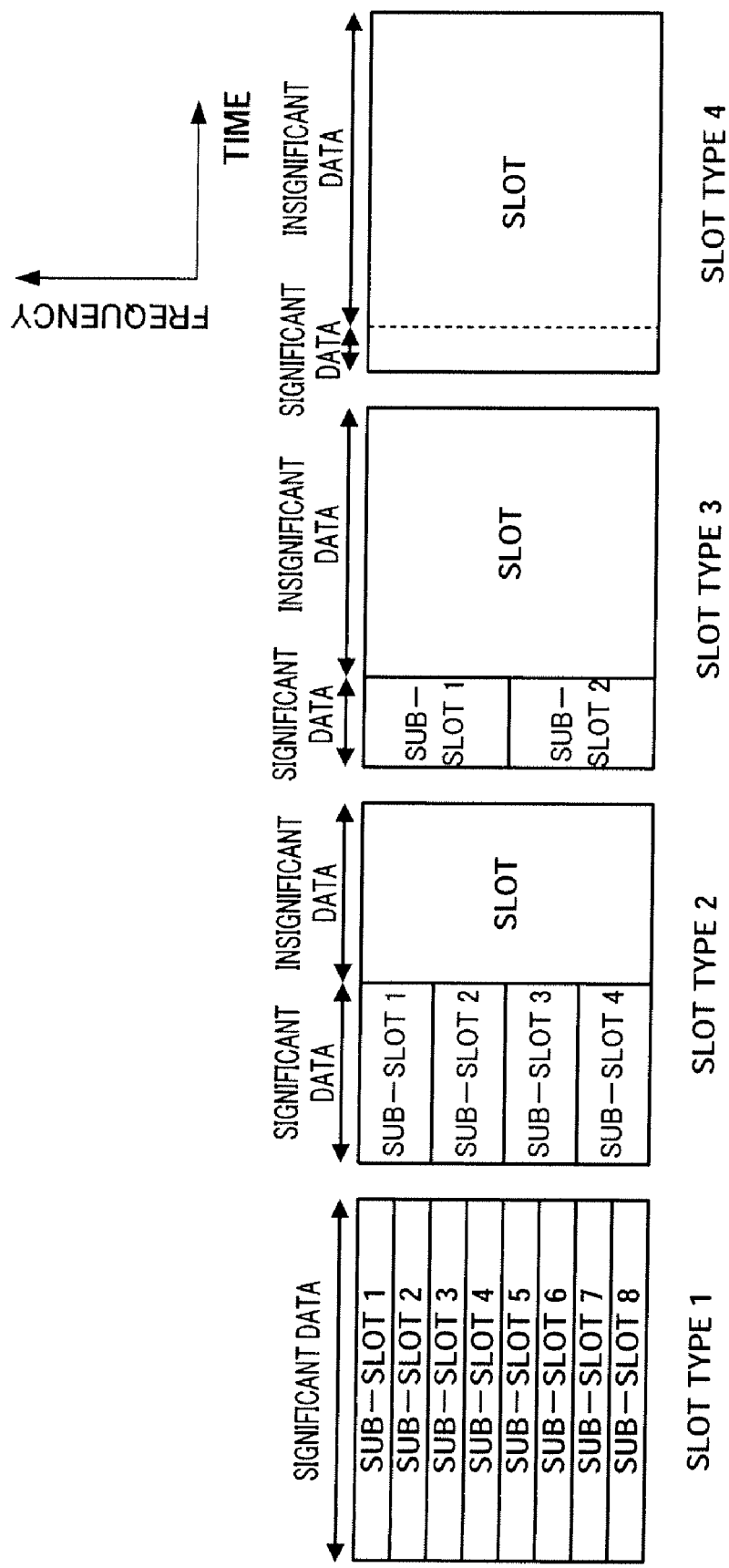
FIG. 13 is an example showing a plurality of transmission slot types.

A plurality of kinds of transmission slot types are stored in advance in transmission slot type setting section 301. FIG. 13 shows an example of a plurality of these transmission slot types. The proportions of the transmission resources for significant data and the transmission resources for insignificant data are different between the transmission slot types.

To be more specific, the proportion of the resource block where significant data is assigned decreases towards the rightmost slot type in FIG. 13, and use of this slot type produces increased collision rates between the mobile stations. If the focus is placed upon the insignificant data, the proportion of the resource block where insignificant data is assigned increases, and the data transmission rate of insignificant data increases, towards the rightmost slot type. On the other hand, the proportion of the resource block where significant data is assigned increases towards the leftmost slot type and use of this slot type produces decreased collision rates between the mobile stations.

Based on the signaling (i.e. report) of slot type control information from the base station, transmission slot type setting section 301 selects a transmission slot type using upon the RACH transmission, out of a plurality of the transmission slot types.

The base station controls the transmission slot type based on great or small "UE access count" and signals the slot type control information to the mobile station via the broadcast control channel. The "UE access count" refers to the number of mobile stations located in the area covered by the communication system and that have their locations registered in the base station. FIG. 14 is an example showing the data table used to select a transmission slot type based on the UE access count (M). As such, as the UE access count increases, the transmission slot type shifts to slot type 1 where the proportion of significant data is high. According to this table, the base station selects the transmission slot type associated with the UE access count and reports the selection result to the mobile station.

Transmission slot type setting section 301 outputs the selected transmission slot type to transmission slot selecting section 107.

Transmission slot selecting section 107 selects a transmission slot matching the slot type outputted from transmission slot type setting section 301 and outputs the selected transmission slot to transmission subslot selecting section 108 and mapping section 104-2.

Figure 15:
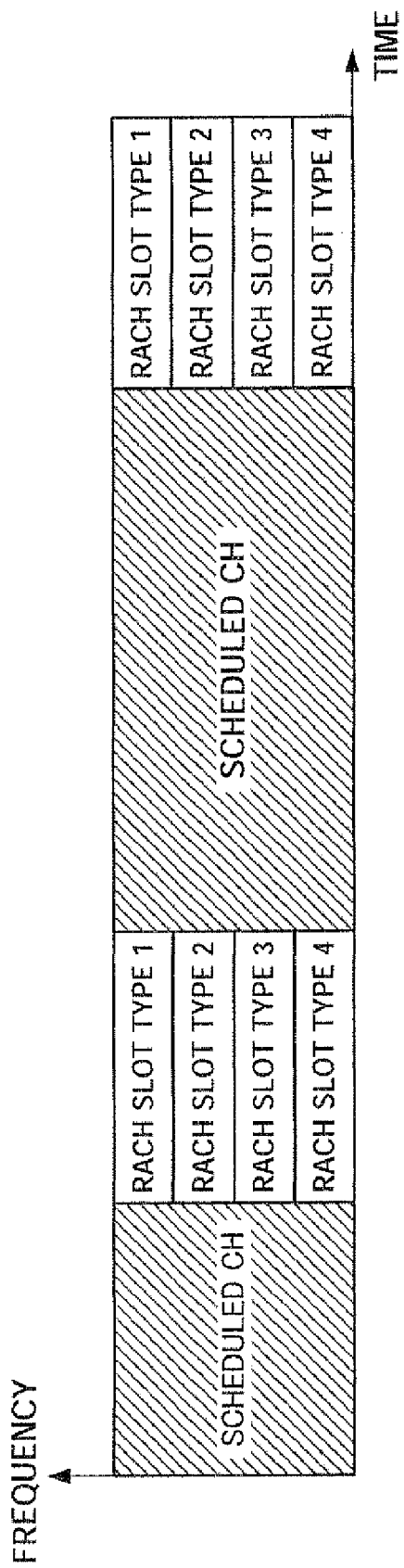
FIG. 15 illustrates a method of multiplexing a plurality of types of transmission slots (frequency multiplexing)
Figure 16:
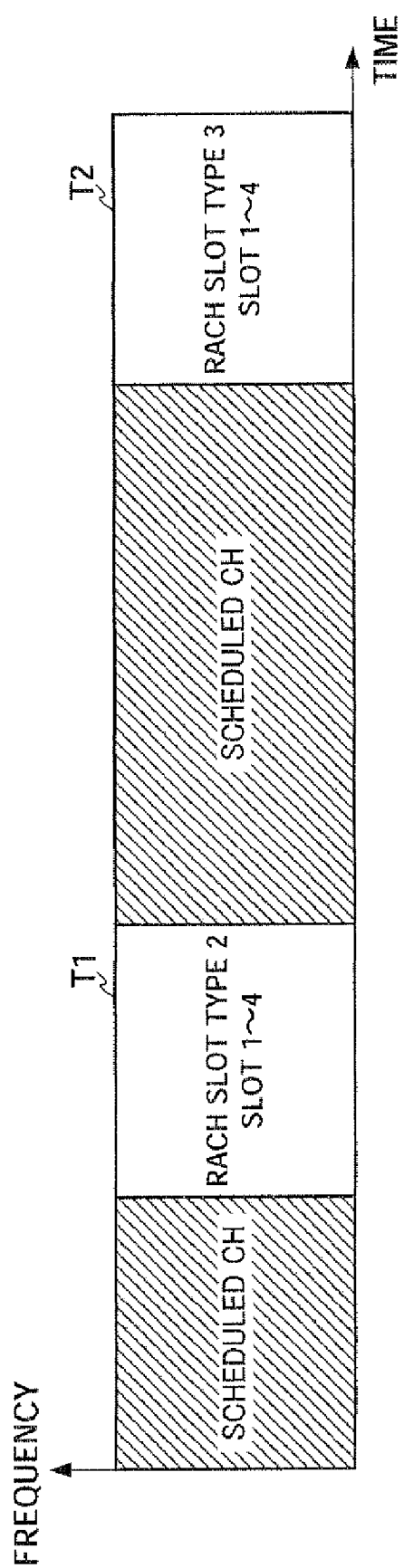
FIG. 16 illustrates a method of multiplexing a plurality of types of transmission slots (time multiplexing)

The method of multiplexing a plurality of types of transmission slots may utilize frequency multiplexing as shown in FIG. 15 or may utilize time multiplexing as shown in FIG. 16. In the example of FIG. 15, the RACH transmission slot following the scheduled channel is divided into four frequency bands, and slot types 1 to 4 are applied to these. On the other hand, in the example of FIG. 16, the RACH transmission slots T1 and T2 following the scheduled channel are each divided in four time slots (slots 1 to 4). Then, slot type 2 is applied to transmission slot T1, and slot type 3 is applied to transmission slot T2. By this means, in the case of time-multiplexing, slot types are changed in a relatively wide interval. For mobile stations that change the slot types according to the signaling from the base station, this configuration for changing the slot types in the time domain is more suitable.

In this way, according to the present embodiment, the base station controls the slot types based on the UE access count. That is, when a high UE access count and a high collision rate are anticipated, the base station selects a slot type in which the proportion of resources allocated for significant data including the pilot and UE-ID is high (e.g. slot types 1 and 2 in FIG. 13), and reports the selected slot type to the mobile station, thereby reducing the RACH collision rate between mobile stations. Moreover, conversely, when a low UE access count and a low collision rate are anticipated, the base station selects a slot type in which the proportion of resources for insignificant data (i.e. other transmission information) is great (e.g. slot types 3 and 4 in FIG. 13), and reports the selected slot type to the mobile station, thereby increasing the transmission rate of the communication system.

Figure 17B:
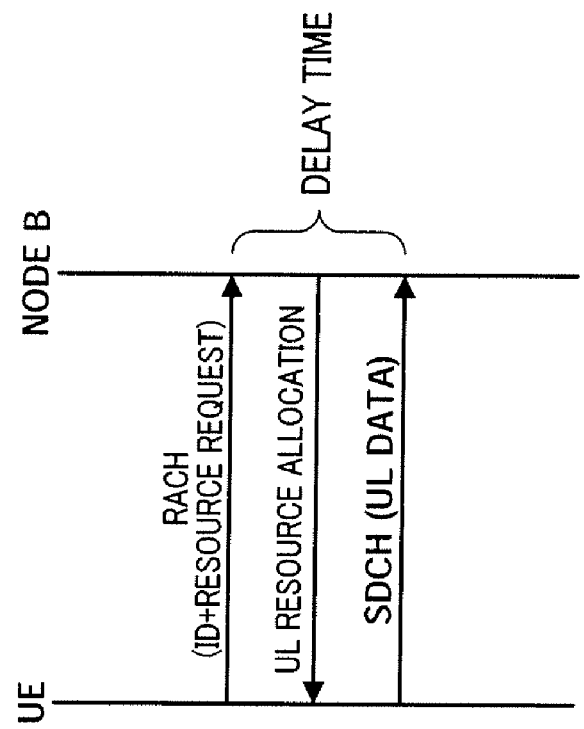
FIG. 17 explains the benefit of increased transmission rate.
Figure 17A:
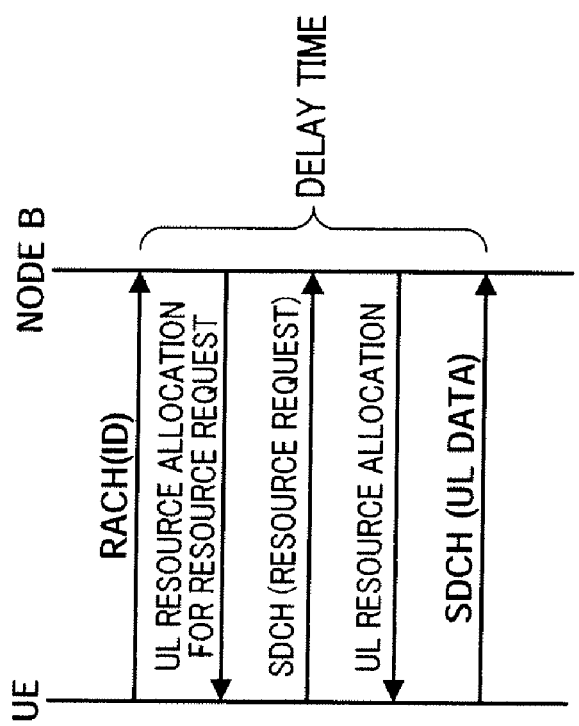

Increased transmission rates produce the following benefit. That is, when the transmission rate increases, as shown in FIG. 17, the scheduled channel, which is a data transmission channel, can be set efficient (i.e. transmission power, modulation scheme, coding rate and transmission band are set optimal), so that it is possible to shorten exchange of control information after the RACH starts being transmitted until the real data is transmitted, and reduce the delay time until the real data is transmitted. The delay time in FIG. 17B is reduced, compared to the delay time in FIG. 17A.

Although a configuration has been explained as an example with the present embodiment where transmission slot type setting section 301 selects the slot type when the RACH starts being transmitted according to the signaling of slot type control information from the base station, transmission slot type setting section 301 may also select the slot type based on the number of times the RACH is retransmitted detected in the mobile station in a predetermined frequency band. In this way, by changing the slot types in a predetermined band, the mobile station uses the slot types with many resources for significant data including the pilot and UE-ID (e.g. slot types 1 and 2 shown in FIG. 13) when the number of times the RACH is retransmitted is high, so that the collision rate can be reduced. FIG. 18 is an example of the data table used upon selecting the slot type based on the number of times the RACH is retransmitted (N).

Moreover, by allowing the mobile station to select the slot type according to the number of times the RACH is retransmitted, it is possible to reduce the number of times the RACH is retransmitted and prevent excessive communication delay time for other transmission information. In this case, as shown in FIG. 15, the configuration providing different slot types in the frequency domain is suitable.

Moreover, although a configuration has been explained with the present embodiment where, for example, in the case of frequency multiplexing, slot types 1 to 4 are not applied to the same band, or, in the case of time-multiplexing, slot types 1 to 4 are not multiplexed over the same timing, different configurations may be employed where different slot types are frequency-multiplexed over the same band (frequency multiplexing) or time-multiplexed over the same timing (time multiplexing) as long as the radio receiving apparatus can detect and identify the slot types.

Embodiments of the present invention have been explained.

The radio transmitting apparatus and radio transmission method according to the present invention are not limited to the embodiments above and can be implemented in various modifications.

Moreover, the radio transmitting apparatus according to the present invention may be provided in mobile communication terminal apparatuses and base station apparatuses and by this means provide communication terminal apparatuses, base station apparatuses and mobile communication systems having the same effect as described above.

Moreover, the UE-ID includes the preamble, that is, a data sequence repeating the signature (the spreading code sequence). Further, when the UE-ID is the preamble, the preamble can be used as a known bit, and so the radio transmitting apparatus of the present invention may not necessarily transmit the pilot.

Moreover, although cases have been explained here as an example to use the discrete Fourier transform (DFT), the fast Fourier transform (FFT) may also be used when the number of inputted data is powers of two.

Moreover, although cases have been explained here as an example to use the inverse fast Fourier transform (IFFT), the inverse discrete Fourier transform (IDFT) may be used instead of IFFT.

Moreover, although cases have been explained as an example here where the DFT-s-OFDM configuration is adopted, the present invention is not limited to this, and the IFDMA (Interleaved Frequency Division Multiple Access) configuration may be also adopted.

Moreover, significant data such as the UE-ID and pilot may be referred to as "preamble" in 3GPP RAN LTE, and insignificant data such as other control information may be referred to as "message."

The UE-ID refers to information that allows the base station to identify the mobile stations transmitting the RACH, and includes the following information.
1. Common IDs for all cells (unique ID for each communication terminal). For example, ID for location registration use.
2. Unique ID per cell.
3. A pilot and a signature may be applicable if mobile stations can be distinguished from the code pattern. Here, the signature refers to a code pattern group known between the transmission side and the receiving side, that is, the information whereby mobile stations can be uniquely specified.
4. The unique ID for all cells may be included in the insignificant data and not the significant data if a pilot is UE-ID (including a signature).

Although with the above embodiments cases have been described where the present invention is configured by hardware, the present invention may be implemented by software. For example, by describing algorithm of the radio transmission method according to the present invention in a programming language, storing this program in a memory and making the information processing section execute this program, it is possible to implement the same function as the radio transmitting apparatus of the present invention.

Each function block employed in the description of each of the aforementioned embodiments may typically be implemented as an LSI constituted by an integrated circuit. These may be individual chips or partially or totally contained on a single chip.

"LSI" is adopted here but this may also be referred to as "IC," "system LSI," "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosures of Japanese Patent Application No. 2006-023607, filed on Jan. 31, 2006, and Japanese Patent Application No. 2006-083380, filed on Mar. 24, 2006, including the specifications, drawings and abstracts are incorporated herein by reference in their entirety.

Industrial Applicability

The transmitting apparatus and the transmission method according to the present invention are applicable to, for example, mobile communication apparatuses, base station apparatuses in mobile communication systems.

The invention claimed is:

1. A radio communication apparatus in which resource blocks for a channel transmitted between the radio communication apparatus and a plurality of other radio communication apparatuses at random timings comprise a first resource block and a second resource block, the radio communication apparatus comprising:
a transmission slot selecting section that selects one transmission slot from a plurality of transmission slots on a random basis;
a subslot selecting section that selects a subslot from a plurality of subslots forming a first part of the selected transmission slot on a random basis;
a first allocation section that allocates data to be prevented from collision to the first resource block allocated to the selected subslot;
a second allocation section that allocates data other than the data to be prevented from collision to the second resource block allocated to a second part of the selected transmission slot; and
a transmission section that transmits the first resource block and the second resource block to which the data is allocated.

2. The radio communication apparatus according to claim 1, wherein a proportion of the first resource blocks with respect to all of the resource blocks for the channel is set to be greater than a proportion of the second resource blocks.

3. The radio communication apparatus according to claim 2, wherein a number of the radio communication apparatuses allocated to the first resource blocks is set greater than a number of the radio communication apparatuses allocated to the second resource blocks.

4. The radio communication apparatus according to claim 1, further comprising a changing section that adaptively changes a proportion of the first resource blocks with respect to all of the resource blocks for the channel.

5. The radio communication apparatus according to claim 4, wherein the changing section adaptively changes the proportion of the first resource blocks in accordance with an access condition of the plurality of other radio communication apparatuses.

6. The radio communication apparatus according to claim 4, wherein the changing section changes the proportion of the first resource blocks based on information received from the plurality of other radio communication apparatuses.

7. The radio communication apparatus according to claim 6, wherein the information received from the plurality of other radio communication apparatuses is information related to access conditions of the plurality of other radio communication apparatuses.

8. The radio communication apparatus according to claim 7, wherein the changing section changes the proportion of the first resource blocks to be greater when the information related to the access conditions shows an access increase.

9. The radio communication apparatus according to claim 1, further comprising:
a first attaching section that attaches a first cyclic prefix to the first resource block; and
a second attaching section that attaches a second cyclic prefix to the second resource block,
wherein the first attaching section sets a signal length of the first cyclic prefix to be greater than a signal length of the second cyclic prefix.

10. The radio communication apparatus according to claim 1, wherein the first allocating section allocates an identification of the radio communication apparatus to the first resource block.

11. The radio communication apparatus according to claim 1, wherein the first resource block comprises a plurality of frequency division blocks dividing a common time slot in a frequency direction.

12. The radio communication apparatus according to claim 1, wherein the first resource block is further divided into resource blocks for the radio communication apparatuses.

13. The radio communication apparatus according to claim 1, wherein identification information and a pilot for each of the radio communication apparatuses are used as the data to be prevented from collision.

14. The radio communication apparatus according to claim 1, wherein a random access channel is used for the channel.

15. The radio communication apparatus according to claim 1, wherein a contention based channel is used for the channel.

16. The radio communication apparatus according to claim 1, further comprising a transmission slot type setting section that selects a transmission slot type used for transmission from a plurality of transmission slot types, proportions of the plurality of transmission slot types being different between the first resource block and the second resource block,
wherein the transmission section transmits the first resource block and the second resource block to which the data is allocated, using the selected transmission slot type.

17. The radio communication apparatus according to claim 16, wherein in the transmission slot type setting section, the plurality of transmission slot types are associated per frequency, and the transmission slot type setting section selects a transmission slot type in which a proportion of the first resource blocks is high when a number of retransmissions of the channel is high, or selects a transmission slot type in which the proportion of the first resource blocks is low when a number of retransmissions of the channel is low.

18. A communication terminal apparatus comprising the radio communication apparatus according to claim 1.

19. A base station apparatus comprising the radio communication apparatus according to claim 1.

20. A random access channel transmission method performed by a radio communication apparatus in which resource blocks for a channel transmitted between the radio communication apparatus and a plurality of other radio communication apparatuses at random timings comprise a first resource block and a second resource block, the random access channel transmission method comprising:
selecting one transmission slot from a plurality of transmission slots on a random basis;
selecting a subslot from a plurality of subslots forming a first part of the selected transmission slot on a random basis;
allocating data to be prevented from collision to the first resource block allocated to the selected subslot;
allocating data other than the data to be prevented from collision to the second resource block allocated to a second part of the selected transmission slot; and
transmitting the first resource block and the second resource block to which the data is allocated.

* * * * *